Patented June 3, 1947

2,421,623

UNITED STATES PATENT OFFICE 2,421,623

IMPREGNATED ABRASIVE WHEEL

Samuel S. Kistler, West Boylston, Mass., assignor to Norton Company, Worcester, Mass., a corporation of Massachusetts No Drawing. Application December 21, 1944, Serial No. 569,261

11 Claims. (Cl. 51—295)

This invention relates to a grinding wheel and more particularly to a wheel formed of abrasive grains bonded by vitrified ceramic material which has its pores impregnated with a beneficial grinding agent.

In accordance with my prior Patent #2,327,846 of August 24, 1943, I have made a grinding wheel of abrasive grains united by a resin bond comprising a chlorinated aliphatic straight chain polymer capable of releasing hydrogen chloride under the heat effect at the grinding line. I have now found that a vitrified grinding wheel may be benefited by impregnating it with a granular active filler containing polyvinyl chloride, vinylidene dichloride, rubber hydrochloride, chlorinated rubber, chlorinated polyisobutylene or analogous materials belonging to the class of saturated, aliphatic, straight chain polymers containing chlorine which are capable of releasing hydrogen chloride when subjected to the heat of a grinding operation.

The primary object of this invention is to provide a grinding wheel of this type which has the grinding characteristics of a vitrified bonded abrasive and yet carries at the grinding zone an agent providing chlorine or capable of releasing hydrogen chloride. Further objects will be apparent in the following disclosure.

In accordance with my invention, I provide a grinding wheel made of suitable abrasive grains, such as crystalline alumina, silicon carbide, or other standard abrasive, which are bonded by means of a vitrified ceramic material as a self-supporting, integral body capable of grinding action as such. This type of wheel may be made in accordance with standard practice and provided with a suitable porosity by the procedure set forth in the patent to Howe & Martin #1,983,082 of December 4, 1934. In order to improve the dry grinding properties of such a wheel, I may incorporate in the pores thereof one of the chlorinated hydrocarbon polymers above specified by means of a fluid or molten filler capable of being heat hardened or polymerized in situ within the pores of the wheel.

The chlorinated hydrocarbons, when polymerized, are powders and may be obtained on the market as such. These polymers may be suspended in a polymerizable matrix, such as a phenol formaldehyde condensation product in the liquid or A stage, or I may use a polymerizable matrix of the type set forth in the copending application of Loring Coes, Jr., Serial No. 553,111, filed September 7, 1944, now U. S. Patent No. 2,377,995, which comprises a monomeric solution of lignin in furfuryl alcohol and furfural.

For example, a porous vitrified bonded grinding wheel may be impregnated in the following manner:

Lignin may be prepared by desulphonating an impure lignin product obtained from the sulphite paper making process. The material is a polymerized powder which is not moldable by itself. It is, however, soluble in furfuryl alcohol, and the solution may be polymerized with the aid of a catalyst, such as toluene sulphonic acid. This catalyst is preferably dissolved in furfural so as to slow down the explosive-like polymerization reaction caused by the catalyst. The lignin dissolved in the furfuryl alcohol solution may be incorporated in the grinding wheel pores and the mass thereafter polymerized in place. This solution of lignin and furfural in furfuryl alcohol constitutes a suitable matrix for suspending the various powdered fillers, as it has a sufficiently viscous body to hold the same as a dispersion or in suspension and to carry them into the wheel pores.

In order to prepare the resin, I may dissolve 120 grams of paratoluene sulphonic acid in 1300 cc. furfural which is well cooled during the procedure. Thereafter, 2190 grams of a desulphonated lignin resin, which is sold commercially under the name of Meadol, is stirred into the furfural. Then 4380 grams of furfuryl alcohol is added rapidly and with good cooling so as to prevent polymerization. I may add any of the above fillers thereto in order to modify the grinding action. For example, I may employ 7500 grams of polyvinyl chloride or rubber hydrochloride or any of the other fillers and stir it into the resin solution as thus prepared.

This resin carrying the polymerized filler in suspension may be put into the wheel pores by the mere act of immersing the wheel in the solution. For example, I may employ an open topped mold or receptacle within which the wheel will loosely fit. The solution is placed in the mold, and the wheel is then slowly lowered into it as the solution penetrates the pores. Also, I may evacuate the chamber containing the wheel immersed in the matrix to remove the air and thereafter allow the matrix to be forced into the wheel by the atmospheric pressure. While the wheel remains in the mold, the body is subjected to heat in order to harden the resin solution. This may be accomplished by heating the wheel for 48 hours at 90° C. and then at 150° C. for an additional 8 hours. It is to be observed that since there is no formation of steam or other objectionable gas by polymerization of this resin solution, it is not necessary to confine the wheel in a pressure mold. In fact, the wheel may be removed from the reservoir container as soon as the polymerization has hardened the material in the surface pores. Hence expensive pressure molding equipment is not tied up in this process.

I may also use the phenol formaldehyde condensation product in the liquid or A stage, and mix a suitable quantity of the chlorinated hydrocarbon filler therein. This material may be incorporated into the pores of the wheel as above described. Thereafter, the wheel is heated while the liquid is confined in a mold so as to polymerize the resin to its final infusible heat hardened condition. This is done by standard procedure, such as that of heating the wheel containing the resin within a mold to a temperature of 90° C. to set the resin and then heating it to 60° C. for 24 hrs. to complete the polymerization.

I may employ various other materials as the matrix. For example, I may melt rosin and suspend the rubber hydrochloride or other filler therein by suitably stirring the filler into the molten matrix. I then incorporate the mass into a wheel which has been suitably heated to prevent the rosin from hardening until after the pores have been filled. Upon cooling the wheel, the rosin becomes hard and holds the chlorinated hydrocarbon in suspension within the wheel pores.

The resinous matrix employed for the purpose of carrying the filler into the wheel and holding it there is not intended to serve as a bond for the abrasive grains, since the wheel structure has been fully made prior to the act of impregnating the pores. That is, the abrasive grains are bonded solely by means of the vitrified ceramic bond. The resinous matrix serves both as a filler for the pores which minimizes loading during the dry grinding operation and also as a solid medium which holds the chlorinated polymer in position.

The active filler has the peculiar property of releasing hydrogen chloride or other strongly acid compound at the surface of the metal being ground. This action is probably due to the high temperature involved at the local point of contact between the abrasive grains and the metal. This filler in some way aids the grinding operation, while the resinous filler minimizes any tendency for metal particles removed from the work to load into the wheel pores. Thus I obtain the beneficial effects of the resin and the chlorine reagent in the use of a vitrified grinding wheel which is eminently fitted for a snagging or other dry grinding operation. It will also be evident that I may include other fillers with the saturated aliphatic straight chain, chlorine containing polymer above described, in order to modify the grinding action further. But these polymers are the essential fillers employed in accordance with this invention.

It will now be understood that the above disclosure is intended to illustrate the principles of this invention and a preferred embodiment thereof and not as imposing limitations on the appended claims.

I claim:

1. An abrasive article comprising abrasive grains bonded as an integral porous body by a vitrified ceramic material and a two-phase filler comprising essentially a saturated aliphatic straight chain polymer containing chlorine which is suspended in and held in place within the pores by means of a solid resin matrix.

2. An abrasive article comprising abrasive grains bonded as an integral porous body by a vitrified ceramic material and a two-phase filler comprising essentially a saturated aliphatic straight chain polymer containing chlorine which is suspended in and held in place within the pores by means of a solid resin matrix, comprising a monomeric resin polymerized in situ within the pores.

3. An abrasive article comprising abrasive grains bonded as an integral porous body by a vitrified ceramic material and a two-phase filler comprising essentially a saturated aliphatic straight chain polymer containing chlorine which is suspended in and held in place within the pores by means of a solid resin matrix, comprising a monomeric resin polymerized in situ within the pores, said filler being selected from the group consisting of polyvinyl chloride, vinylidene dichloride, rubber hydrochloride, chlorinated rubber and chlorinated polyisobutylene.

4. The method of making an abrasive article comprising the steps of providing a porous body of abrasive grains bonded integrally by a vitrified ceramic material, incorporating in a heat hardenable matrix a suspension of a filler comprising essentially a saturated aliphatic straight chain polymer containing chlorine, filling the pores of said article with said suspension of filler in the matrix and thereafter hardening the matrix in situ.

5. The method of making a grinding wheel comprising the steps of providing a porous wheel of abrasive grains bonded integrally by a vitrified ceramic material, incorporating in a heat polymerizable fluid matrix a suspension of a granular filler comprising essentially a saturated aliphatic straight chain polymer containing chlorine for release at the grinding line, impregnating the wheel pores with said suspension of filler in the matrix and thereafter heating the filled wheel to polymerize the matrix and secure the filler in place.

6. An abrasive article according to claim 1, in which the saturated aliphatic straight chain polymer is vinylidene dichloride.

7. An abrasive article according to claim 1, in which the saturated aliphatic straight chain polymer is polyvinyl chloride.

8. An abrasive article according to claim 1, in which the saturated aliphatic straight chain polymer is rubber hydrochloride.

9. An abrasive article according to claim 2, in which the saturated aliphatic straight chain polymer is vinylidene dichloride.

10. An abrasive article according to claim 2, in which the saturated aliphatic straight chain polymer is rubber hydrochloride.

11. An abrasive article according to claim 2, in which the saturated aliphatic straight chain polymer is polyvinyl chloride.

SAMUEL S. KISTLER.

REFERENCES CITED

The following references are of record in the file of this patent:

UNITED STATES PATENTS

| Number | Name | Date |
| --- | --- | --- |
| 1,310,360 | Martin | July 15, 1919 |
| 2,122,691 | Kuzmick, et al. | July 5, 1938 |
| 2,327,846 | Kistler | Aug. 24, 1943 |
| 2,357,350 | Oakes | Sept. 5, 1944 |
| 2,367,995 | Buckey | Jan. 23, 1945 |